United States Patent
Biel et al.

(10) Patent No.: US 12,493,754 B1
(45) Date of Patent: Dec. 9, 2025

(54) SYSTEMS AND METHODS FOR USING ONE OR MORE MACHINE LEARNING MODELS TO PERFORM TASKS AS PROMPTED

(71) Applicant: Instabase, Inc., Dover, DE (US)

(72) Inventors: Slawomir Jan Biel, Warsaw (PL); Rafal Powalski, Warsaw (PL)

(73) Assignee: Instabase, Inc., Dover, DE (US)

( * ) Notice: Subject to any disclaimer, the term of this patent is extended or adjusted under 35 U.S.C. 154(b) by 152 days.

(21) Appl. No.: 18/519,800

(22) Filed: Nov. 27, 2023

(51) Int. Cl.
*G06F 40/40* (2020.01)
*G06F 40/30* (2020.01)

(52) U.S. Cl.
CPC .............. *G06F 40/40* (2020.01); *G06F 40/30* (2020.01)

(58) Field of Classification Search
CPC .................................. G06F 40/40; G06F 40/30
See application file for complete search history.

(56) References Cited

U.S. PATENT DOCUMENTS

| | | |
|---|---|---|
| 5,848,184 A | 12/1998 | Taylor |
| 5,898,795 A | 4/1999 | Bessho |
| 7,620,976 B2 | 11/2009 | Low |
| 7,689,431 B1 | 3/2010 | Carmel |
| 7,720,318 B1 | 5/2010 | Phinney |
| 7,725,423 B1 | 5/2010 | Pricer |
| 8,254,681 B1 | 8/2012 | Poncin |
| 8,881,307 B2 | 11/2014 | Nun |
| 9,275,030 B1 | 3/2016 | Fang |
| 9,607,058 B1 | 3/2017 | Gupta |
| 10,242,212 B2 | 3/2019 | Tegegne |
| 10,642,832 B1 | 5/2020 | Neumann |

(Continued)

FOREIGN PATENT DOCUMENTS

| | | | |
|---|---|---|---|
| CN | 117951274 A | 4/2024 |
| CN | 118332072 A | 7/2024 |

(Continued)

OTHER PUBLICATIONS

Li, M., Zhao, Y., Yu, B., Song, F., Li, H., Yu, H., . . . & Li, Y. (2023). Api-bank: A comprehensive benchmark for tool-augmented llms. arXiv preprint arXiv:2304.08244. (Year: 2023).*

(Continued)

*Primary Examiner* — Bhavesh M Mehta
*Assistant Examiner* — Philip H Lam
(74) *Attorney, Agent, or Firm* — Esplin & Associates, PC

(57) ABSTRACT

Systems and methods to use one or more machine learning models to perform tasks as prompted using one or more tools are disclosed. Exemplary implementations may receive user input indicating a query; generate prompt information defining a prompt based on the query; provide the prompt as input to one or more machine learning models; obtain one or more replies for individual tasks; and present the one or more replies. The prompt may be configured to prompt the one or more machine learning models to identify the individual tasks based on the prompt; determine a step to be completed; select a tool for performing the step; perform the step using the tool to generate a first tool result; generate an intermediary prompt based on the first tool result; determine whether the intermediary prompt is sufficient; identify tools for generating the one or more replies; and generate the one or more replies.

16 Claims, 3 Drawing Sheets

(56) References Cited

U.S. PATENT DOCUMENTS

| | | |
|---|---|---|
| 10,679,089 B2 | 6/2020 | Annis |
| 11,315,353 B1 | 4/2022 | Cahn |
| 11,947,604 B2 | 4/2024 | Roitman |
| 11,995,394 B1 | 5/2024 | Morariu |
| 12,182,125 B1 | 12/2024 | Buniatyan |
| 2002/0064316 A1 | 5/2002 | Takaoka |
| 2004/0181749 A1 | 9/2004 | Chellapilla |
| 2004/0223648 A1 | 11/2004 | Hoene |
| 2005/0289182 A1 | 12/2005 | Pandian |
| 2008/0148144 A1 | 6/2008 | Tatsumi |
| 2008/0212901 A1 | 9/2008 | Castiglia |
| 2008/0291486 A1 | 11/2008 | Isles |
| 2009/0076935 A1 | 3/2009 | Knowles |
| 2009/0132590 A1 | 5/2009 | Huang |
| 2012/0072859 A1 | 3/2012 | Wang |
| 2012/0204103 A1 | 8/2012 | Stevens |
| 2014/0200880 A1 | 7/2014 | Neustel |
| 2014/0214732 A1 | 7/2014 | Carmeli |
| 2015/0012422 A1 | 1/2015 | Ceribelli |
| 2015/0169951 A1 | 6/2015 | Khintsitskiy |
| 2015/0169995 A1 | 6/2015 | Panferov |
| 2015/0278197 A1 | 10/2015 | Bogdanova |
| 2015/0317486 A1 | 11/2015 | Muller |
| 2016/0014299 A1 | 1/2016 | Saka |
| 2016/0275526 A1 | 9/2016 | Becanovic |
| 2018/0189592 A1 | 7/2018 | Annis |
| 2018/0329890 A1 | 11/2018 | Ito |
| 2019/0138660 A1 | 5/2019 | White |
| 2019/0171634 A1 | 6/2019 | Nowakiewicz |
| 2019/0286900 A1 | 9/2019 | Pepe, Jr. |
| 2019/0340949 A1 | 11/2019 | Meisner |
| 2020/0004749 A1 | 1/2020 | Slezak |
| 2020/0089946 A1 | 3/2020 | Mallick |
| 2020/0104359 A1 | 4/2020 | Patel |
| 2020/0159848 A1 | 5/2020 | Yeo |
| 2020/0311349 A1 | 10/2020 | Balasubramanian |
| 2020/0320072 A1 | 10/2020 | Hormati |
| 2020/0364343 A1 | 11/2020 | Atighetchi |
| 2020/0379673 A1 | 12/2020 | Le Gallo-Bourdeau |
| 2021/0034621 A1 | 2/2021 | Patel |
| 2021/0258448 A1 | 8/2021 | Yuusuke |
| 2022/0164346 A1 | 5/2022 | Mitra |
| 2022/0398858 A1 | 12/2022 | Cahn |
| 2022/0414075 A1 | 12/2022 | Li |
| 2022/0414430 A1 | 12/2022 | Li |
| 2022/0414492 A1 | 12/2022 | Jezewski |
| 2023/0044564 A1 | 2/2023 | Jezewski |
| 2023/0315731 A1 | 10/2023 | Xu |
| 2023/0334889 A1 | 10/2023 | Cahn |
| 2023/0385261 A1 | 11/2023 | Siddiqui |
| 2024/0096125 A1 | 3/2024 | Yebes Torres |
| 2024/0202539 A1 | 6/2024 | Poirier |
| 2024/0221007 A1 | 7/2024 | Hormati |
| 2024/0256965 A1* | 8/2024 | Chung ............... G06N 20/00 |
| 2024/0311407 A1 | 9/2024 | Barron |
| 2024/0338361 A1 | 10/2024 | Hazel |
| 2025/0045314 A1 | 2/2025 | Madnani |
| 2025/0045445 A1 | 2/2025 | Srinivasan |
| 2025/0077527 A1 | 3/2025 | Vaughn |
| 2025/0086190 A1 | 3/2025 | Azarmi |
| 2025/0086216 A1 | 3/2025 | Murthy |
| 2025/0111167 A1* | 4/2025 | Mcintyre ............. G06F 16/383 |
| 2025/0111237 A1* | 4/2025 | Krishnamurthy ...... G06N 3/091 |
| 2025/0117605 A1* | 4/2025 | De Wynter ............ G06F 40/30 |
| 2025/0165714 A1* | 5/2025 | Krabach ........... G06F 16/33295 |

FOREIGN PATENT DOCUMENTS

| | | |
|---|---|---|
| CN | 118656482 A | 9/2024 |
| CN | 118939782 A | 11/2024 |

OTHER PUBLICATIONS

Schick, T., Dwivedi-Yu, J., Dessì, R., Raileanu, R., Lomeli, M., Hambro, E., . . . & Scialom, T. (2023). Toolformer: Language models can teach themselves to use tools. Advances in Neural Information Processing Systems, 36, 68539-68551. (Year: 2023).*

Qiao, S., Gui, H., Lv, C., Jia, Q., Chen, H., & Zhang, N. (2023). Making language models better tool learners with execution feedback. arXiv preprint arXiv:2305.13068. (Year: 2023).*

Paranjape, B., Lundberg, S., Singh, S., Hajishirzi, H., Zettlemoyer, L., & Ribeiro, M. T. (2023). Art: Automatic multi-step reasoning and tool-use for large language models. arXiv preprint arXiv:2303.09014. (Year: 2023).*

Chaudhuri et al., "Extraction of type style-based meta-information from imaged documents", IJDAR (2001) 3: 138-149. (Year: 2001).

Doermann et al., "Image Based Typographic Analysis of Documents", Proceedings of 2nd International Conference on Document Analysis and Recognition, pp. 769-773, 1993 IEEE. (Year: 1993).

Shafait ("Document image analysis with OCRopus," IEEE 13th International Mulititopic Conference; Date of Conference: Dec. 14-15, 2009) (Year: 2009) 6 pages.

Singh et al. (A Proposed Approach for Character Recognition Using Document Analysis with OCR, Second InternationalConference on Intelligent Computing and Control Systems: Date of Conference: Jun. 14-15, 2018) (Year: 2018) 6 pages.

Slavin et al., "Matching Digital Documents Based on OCR", 2019 XXI International Conference Complex Systems: Control and Modeling Problems (CSCMP), pp. 177-181, published on Sep. 1, 2019. (Year: 2019).

* cited by examiner

SYSTEMS AND METHODS FOR USING ONE OR MORE MACHINE LEARNING MODELS TO PERFORM TASKS AS PROMPTED

FIELD OF THE DISCLOSURE

The present disclosure relates to systems and methods using one or more machine learning models to perform tasks as prompted using one or more tools.

BACKGROUND

Extracting information from electronic documents is known. Presenting information in user interfaces is known. Large language models are known.

SUMMARY

By virtue of the systems and methods described herein, the process of extracting information from documents is improved by enabling machine learning models to better prepare for extracting information and correcting extracted information. Specifically, enabling machine learning models to determine and perform steps prior to generating responses to queries enables the machine learning models to better identify and/or determine information included in or inferred by documents. Additionally, enabling the machine learning models to use tools for performing the steps better prepares the machine learning models for completion of particular tasks. Such improvements enable the machine learning models to more efficiently and more accurately perform tasks related to documents. For example, disclosure regarding user interfaces may be found in U.S. patent application Ser. No. 18/317,623 entitled "SYSTEMS AND METHODS FOR PROVIDING USER INTERFACES TO CONVERSE WITH A CORPUS OF ELECTRONIC DOCUMENTS VIA A LARGE LANGUAGE MODEL," and filed May 15, 2023, which is hereby incorporated by reference into the present disclosure in its entirety. For example, disclosure regarding tools may be found in U.S. patent application Ser. No. 18/332,179 entitled "SYSTEMS AND METHODS FOR USING A LARGE LANGUAGE MODEL FOR TOOL SELECTION," and filed Jun. 9, 2023, which is hereby incorporated into the present disclosure in its entirety.

One aspect of the present disclosure relates to a system configured to use one or more machine learning models to perform tasks as prompted using one or more tools. One or more of the tasks may have a context of a set of one or more documents. In some implementations, individual ones of the one or more documents may span at least 200 pages, may span less than 200 pages, and/or may span any number of pages. The system may include one or more hardware processors configured by machine-readable instructions. The system may be configured to receive user input indicating a query from one or more client computing platforms. In some implementations, the query may indicate a set of one or more tasks. By way of non-limiting example, the set of one or more tasks may include at least a first task indicating a set of one or more documents. The system may be configured to generate prompt information defining a prompt based on the query. The prompt information may include document information, tool information, the query, user history information, a system prompt, and/or other information.

In some implementations, the document information may be for individual ones of the set of one or more documents. By way of non-limiting example, the set of one or more documents may include individual ones of the documents indicated by the query. In some implementations, tool information for an individual tool may indicate the individual tool is available for use by one or more machine learning models 134. In some implementations, tool information for an individual tool may include a description of the individual tool. In some implementations, tool information for an individual tool may include other information. By way of non-limiting example, the individual ones of the set of one or more tools may be used to perform an individual task.

The system may be configured to provide the prompt as input to one or more machine learning models. The one or more machine learning models may be configured to generate one or more replies to the prompt responsive to receipt of the prompt as input. Individual ones of the one or more replies may correspond to individual ones of the set of one or more tasks. By way of non-limiting example, the one or more replies may include a first reply corresponding to the first task. In some implementations, the prompt may be configured to prompt the one or more machine learning models to identify individual ones of the set of one or more tasks based on the prompt information. By way of non-limiting example, the first task may be identified. In some implementations, the prompt may be configured to prompt the one or more machine learning models to determine a step to be completed by the one or more machine learning models. By way of non-limiting example, determining the step may include selecting a first selected tool. The first selected tool may be included in the set of one or more tools for performing the step. The first selected tool may perform the step based on the tool information. The prompt may be configured to prompt the one or more machine learning models to perform the step using the tool. Performing the step may include generating a first tool result based on the step.

The prompt may be configured to prompt the one or more machine learning models to generate an intermediary prompt. The intermediary prompt may be defined by intermediary prompt information. The intermediary prompt may include the prompt information, the first tool result, and/or other information. The prompt may be configured to prompt the one or more machine learning models to determine whether the intermediary prompt is sufficient to enable the one or more machine learning models to generate the first reply. The prompt may be configured to prompt the one or more machine learning models to identify a set of one or more tools for generating a subset of the one or more replies. In some implementations, the set of one or more tools may be identified responsive to determining the intermediary prompt is sufficient. The prompt may be configured to prompt the one or more machine learning models to generate the one or more replies. The one or more replies may be generated using individual ones of the set of one or more tools. By way of non-limiting example, generating the one or more replies may include generating the first reply based on the intermediary prompt information.

The system may be configured to obtain the one or more replies to the individual ones of the set of one or more tasks. The one or more replies may be obtained from the one or more machine learning models. By way of non-limiting example, the first reply may be obtained. The system may be configured to present the one or more replies to the user. The one or more replies may be presented through a user interface on one or more client computing platforms. By way of non-limiting example, the first reply may be presented. The system may be configured to perform other steps.

As used herein, any association (or relation, or reflection, or indication, or correspondency) involving servers, processors, client computing platforms, documents, formats, blocks of content, characters, conversations, presentations, extracted information, classifications, user interfaces, user interface elements, fields, portions, queries, tasks, replies, prompts, tools, models, representations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
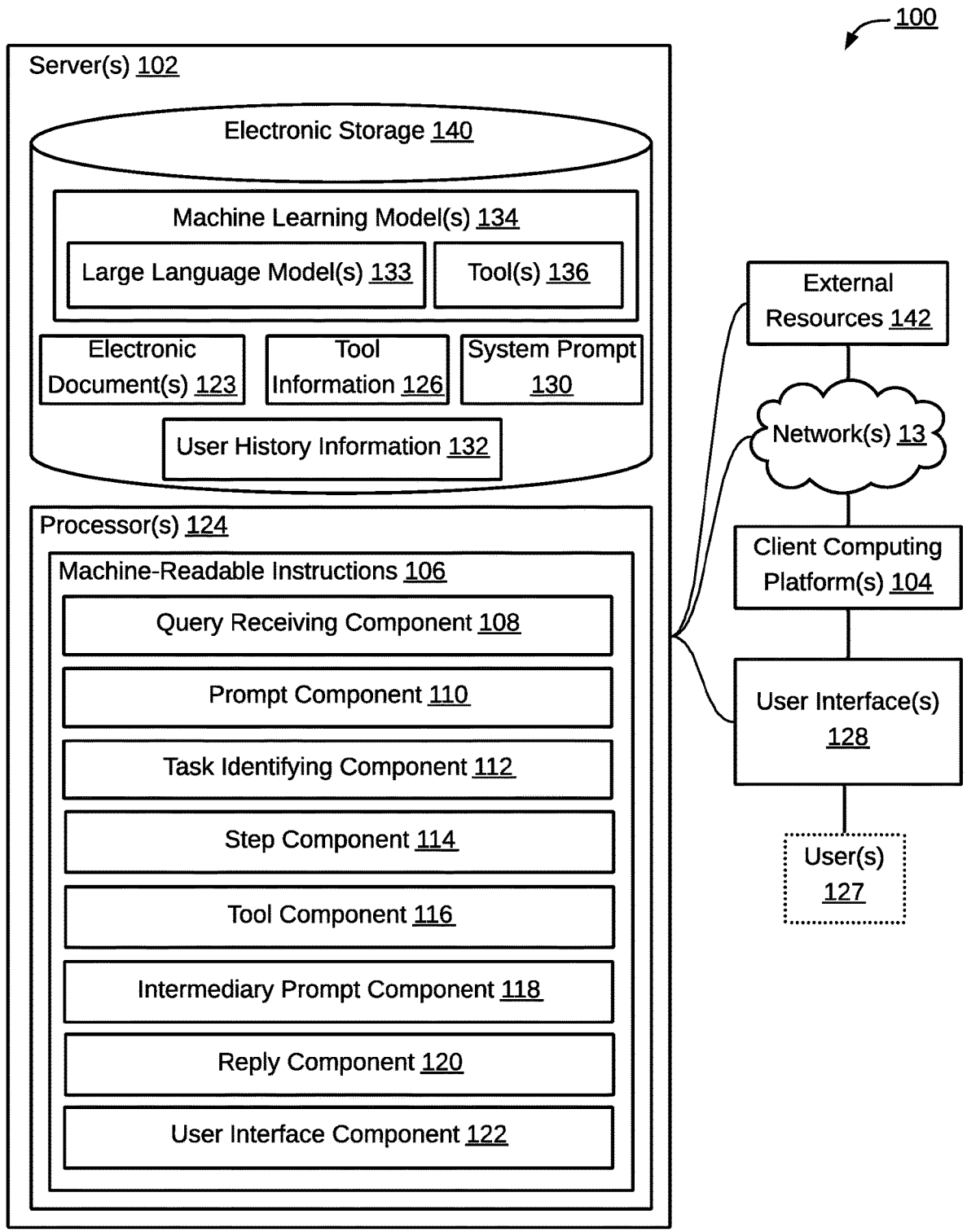
FIG. 1 illustrates a system configured to use one or more machine learning models to perform tasks as prompted using one or more tools.

FIG. 1 illustrates a system 100 configured to use one or more machine learning models 134 (which may include one or more machine learning models) to perform tasks as prompted using one or more tools 136, in accordance with one or more implementations. In some implementations, system 100 may include one or more servers 102, one or more client computing platforms 104, one or more user interfaces 128, external resources 142, one or more large language models 133, one or more other machine learning models 134, one or more tools 136, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures.

Users 127 may access system 100 via client computing platform(s) 104. In some implementations, individual users may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth.

By virtue of the systems and methods disclosed herein, a user may use one or more machine learning models 134 (e.g., a machine learning model such as one or more large language models 133) to select and use one or more tools 136 to aid one or more machine learning models 134 (e.g., a machine learning model such as one or more large language models 133) in performing a set of tasks in accordance with prompts and/or queries from the user. In some implementations, one or more machine learning models 134 may include one or more of large language model(s) 133, one or more tool(s) 136, one or more deep learning models, and/or other hardware or software components. In some implementations, one or more tools 136 may not be included in one or more machine learning models 134. In some implementations, some or all of the tasks pertain to and/or are related to document processing, document understanding, and/or extraction of information from one or more documents.

As used herein, the term "extract" and its variants refer to the process of identifying and/or interpreting information that is included in one or more documents, whether performed by determining, measuring, calculating, computing, estimating, approximating, interpreting, generating, and/or otherwise deriving the information, and/or any combination thereof. In some implementations, extracted information may have a semantic meaning, including but not limited to opinions, judgement, classification, and/or other meaning that may be attributed to (human and/or machine-powered) interpretation. For example, in some implementations, some types of extracted information need not literally be included in a particular electronic source document, but may be a conclusion, classification, and/or other type of result of (human and/or machine-powered) interpretation of the contents of the particular electronic source document. In some implementations, the extracted information may have been extracted by one or more extraction engines. For example, a particular extraction engine (referred to as an OCR engine) may use a document analysis process that includes optical character recognition (OCR). For example, a different extraction engine (referred to as a line engine) may use a different document analysis process that includes line detection. For example, another extraction engine (referred to as a barcode engine) may use a document analysis process that includes detection of barcodes, Quick Response (QR) codes, matrices, and/or other machine-readable optical labels.

Alternatively, and/or simultaneously, in some implementations, the extracted information may have been extracted by a document analysis process that uses machine-learning (in particular deep learning) techniques. For example, (deep learning-based) computer vision technology may have been used. For example, a convolutional neural network may have been trained and used to classify (pixelated) image data as characters, photographs, diagrams, media content, and/or other types of information. In some implementations, the extracted information may have been extracted by a document analysis process that uses a pipeline of steps for object detection, object recognition, and/or object classification. In some implementations, the extracted information may have been extracted by a document analysis process that uses one or more of rule-based systems, regular expressions, deterministic extraction methods, stochastic extraction methods, and/or other techniques. In some implementations, particular document analysis processes that were used to extract the extracted information may fall outside of the scope of this disclosure, and the results of these particular document analysis processes, e.g., the extracted information, may be obtained and/or retrieved by a component of system 100.

Server(s) 102 may be configured by machine-readable instructions 106. Machine-readable instructions 106 may include one or more instruction components. The instruction components may include computer program components. The instruction components may include one or more of a query receiving component 108, a prompt component 110, a task identifying component 112, a step component 114, a tool component 116, an intermediary prompt component 118, a reply component 120, a user interface component 122, and/or other instruction components.

Machine-readable instructions 106 may enable system server(s) 102 to obtain, access, use, and/or fine-tune one or more machine learning models 134, including but not limited to one or more large language models 133. In some implementations, one or more large language models 133 may have been trained on at least a million documents. In some implementations, one or more large language models 133 may have been trained on at least 100 million documents. In some implementations, one or more large language models 133 may include and/or be based on a neural network using over a billion parameters and/or weights. In some implementations, one or more large language models 133 may include and/or be based on a neural network using over a 100 billion parameters and/or weights. In some implementations, one or more large language models 133 may be based on Generative Pre-trained Transformer 3 (GPT3). In some implementations, one or more large language models 133 may be based on ChatGPT, as developed by OpenAI™. In some implementations, one or more large language models 133 may be derived from Generative Pre-trained Transformer 3 (GPT3) or a successor of Generative Pre-trained Transformer 3 (GPT3). In some implementations, machine-readable instructions 106 may enable system server(s) 102 to fine-tune one or more large language models 133 through a set of documents (e.g., training documents). In some cases, the training documents may include financial documents, including but not limited to bank statements, insurance documents, mortgage documents, loan documents, and/or other financial documents. One or more large language models 133 may be able to determine and/or use whether information is formatted in a column, or a row, or a table. Accordingly, information elements in a column, or a row, or a table may be contextually and/or semantically linked and/or otherwise connected such that one or more large language models 133 may extract information from a particular document based on knowledge of the formatted information in the particular document.

By way of non-limiting example, the terms "document," "electronic document," "electronic source document," and derivatives thereof, may be used interchangeably. For example, a set of documents may be provided as input or context for a prompt provided to one or more machine learning models 134 (e.g., provided to a machine learning model such as one or more large language models 133). By way of non-limiting example, at least some of the tasks may have a context of a set of one or more (electronic) documents 123. By way of non-limiting example, the electronic formats of any (electronic) documents 123 may be one or more of Portable Document Format (PDF), Portable Network Graphics (PNG), Tagged Image File Format (TIF or TIFF), Joint Photographic Experts Group (JPG or JPEG), and/or other formats. Electronic documents 123 may be stored and obtained as electronic files.

In some implementations, an electronic document may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/or other financial documents. As used herein, documents may be referred to as "source documents" when the documents are originally published, generated, produced, communicated, and/or made available, or when the documents are copies thereof. Alternatively, and/or simultaneously, documents may be referred to as "source documents" when the documents are a source of human-readable information, or a basis or a container for human-readable information.

In some implementations, one or more electronic formats used for electronic documents 123 may encode visual information that represents human-readable information. For example, the human-readable information may be positioned on multiple line positions. In some implementations, the visual information may include one or more blocks of content, such as, e.g., a first block of content, a second block of content, and so forth. Blocks of content may represent human-readable information, such as characters, words, dates, amounts, phrases, etc. In a particular case, different blocks of content may be (positioned) on different lines or line positions. For example, the first block of content may be positioned above or below the second block of content. For example, a third block of content may be positioned above or below a fourth block of content. As an example, two characters could be vertically aligned if they are positioned on the same line, so neither is above or below the other. For example, the elements in a row of a table may be vertically aligned, and the elements in a column of a table may be horizontally aligned. In some implementations, one or more electronic formats used for the electronic documents may be such that, upon presentation of the electronic documents through user interface(s) 128, the presentation(s) include human-readable information. By way of non-limiting example, human-readable information may include any combination of numbers, letters, diacritics, symbols, punctuation, and/or other information (jointly referred to herein as "characters"), which may be in any combination of alphabets, syllabaries, and/or logographic systems. In some implementations, characters may be grouped and/or otherwise organized into groups of characters (e.g., any word in this disclosure may be an example of a group of characters, particularly a group of alphanumerical characters). For example, a particular electronic source document 123 may include multiple groups of characters, such as, e.g., a first group of characters, a second group of characters, a third group of characters, a fourth group of characters, and so forth. Groups of characters may be included in blocks of content.

The electronic formats may be suitable and/or intended for human readers, and not, for example, a binary format that is not suitable for human readers. For example, the electronic format referred to as "PDF" is suitable and intended for human readers when presented using a particular application (e.g., an application referred to as a "PDF reader"). In some implementations, particular electronic source document 123 may represent one or more of a bank statement, a financial record, a photocopy of a physical document from a government agency, and/or other documents. For example, a particular electronic source document 123 may include a captured and/or generated image and/or video. For example, a particular electronic source document 123 may be a captured and/or generated image. Individual ones of electronic documents 123 may have a particular size and/or resolution.

Query receiving component 108 may be configured to receive user input indicating queries from one or more client computing platforms 104. The individual queries may indicate tasks to be performed by one or more machine learning models 134. By way of non-limiting example, user input indicating a particular query may be received. The particular query may indicate one or more of a set of one or more tasks, a set of one or more documents, and/or other information. By way of non-limiting example, query receiving component 108 may be configured to receive second user input indicating a second query. For example, the second user input may be received after the user input. In some implementations, individual ones of the set of one or more tasks may be units of work to be performed by one or more machine learning models 134. In some implementations, individual tasks may be correlated with individual sets of one or more documents. By way of non-limiting example, the set of one or more tasks may include at least a first task indicating a set of one or more documents. Such correlation between an individual task and an individual set of one or more documents may be a result of the individual task indicating the individual set of one or more documents. By way of non-limiting example, the set of one or more tasks may include a second task indicating a second set of one or more documents. For example, the set of one or more documents and the second set of one or more documents may be the same and/or different sets of one or more documents. In some implementations, individual sets of one or more documents indicated by individual tasks may include individual ones of one or more electronic documents 123.

In some implementations, a particular user 127 may provide the user input via a particular client computing platform 104. In some implementations, one or more user interfaces 128 may be configured to obtain entry of user input from one or more users 127. Particular user 127 may provide the user input to a particular user interface 128 presented on a particular client computing platform 104. In some implementations, the user input may include selection and/or entry of one or more documents 123. In some implementations, the user input may include user selection and/or entry of one or more tasks. By way of non-limiting example, the user selection may include selecting one or more tasks from a pre-set list presented via one or more user interfaces 128 and/or other methods. By way of non-limiting example, the user entry may include manual entry of natural language indicating one or more tasks and/or other methods. By way of non-limiting example, a user may select and/or enter one or more particular documents in association with a particular task. In some implementations, particular user interface 128 may be a chat interface enabling one or more users 127 to "converse" with one or more documents 123 and/or one or more machine learning models 134.

By way of non-limiting example, a first query may include a natural language question of "What is the two-year CAGR for Example Company's revenue?" and/or other information. For example, the natural language questing may have been entered via a text box presented as part of particular user interface 128. By way of non-limiting example, a first task as indicated by the first query may be to "determine the two-year Compound Annual Growth Rate (CAGR) for Example Company's revenue." In some implementations, one or more documents 123 may not be explicitly indicated by the query. For example, individual ones of one or more documents 123 may have been entered and/or selected by the user prior to and/or after the first query being entered and/or selected.

Prompt component 110 may be configured to generate prompts for individual ones of the queries. In some implementations, generating the prompts may include generating prompt information for individual ones of the prompts. In some implementations, the prompt information for the individual ones of the prompts may define the individual ones of the prompts. In some implementations, the prompt information for the individual ones of the prompts may include document information, tool information 126, the individual ones of the queries, user history information 132, a system prompt 130, and/or other information.

By way of non-limiting example, one or more of a prompt for the particular query, a second prompt for the second query, and/or other prompts may be generated. Particular prompt information for the particular query may be generated. The particular prompt information may include first document information, first tool information, the particular query, first user history information, system prompt 130, and/or other information. In some implementations, the particular prompt information may define the prompt. By way of non-limiting example, first tool information may be included in tool information 126. By way of non-limiting example, first user history information may be included in user history information 132. In some implementations, the first document information may be for the set of one or more documents. By way of non-limiting example, the set of one or more documents may include a particular electronic document 123 indicated by the query. The document information for the set of one or more documents may include one or more of a summary of particular document 123, a description of particular document 123, particular document 123, text included in particular document 123, a portion of particular document 123, and/or other information. By way of non-limiting example, the second prompt may be defined by second prompt information. The second prompt information may have been generated by prompt component 110. Second prompt information may include second document information, second tool information, the second query, second user history information, system prompt 130, and/or other information. For example, the second user history information may characterize one or more of a first prompt, one or more replies to the first prompt, step information, and/or other information. In some implementations, the step information may characterize one or more steps completed for completion of one or more tasks indicated by a first query, results of completion of the one or more steps, and/or other information.

In some implementations, tool information 126 may be for individual ones of a set of one or more tools. By way of non-limiting example, the set of one or more tools may include one or more tools 136. In some implementations, tool information 126 for a particular tool 136 may indicate particular tool 136 is available for use by one or more machine learning models 134, may include a description of particular tool 136, and/or may include other information. By way of non-limiting example, the individual ones of the set of one or more tools may be used to perform an individual task. In some implementations, an individual tool may be a relation between an input received by one or more machine learning models 134 and an output generated by one or more machine learning models 134. In some implementations, the output may be generated by one or more machine learning models 134 responsive to receipt of the input.

Tool(s) 136 may include tools that are available to the user, to one or more machine learning models 134, to one or more large language models 133, and/or to another entity to perform tasks. Some tools may be part of and/or built into one or more large language models 133. For example, tools 136 may include, without limitation, a retrieval tool, a keyword search tool, a text processor tool, a summarizer tool, a segment retrieval tool, a calculator, a translator tool, and/or other tools. In some implementations, the retrieval tool may answer certain types of questions about a set of one or more documents. In some cases, the retrieval tool may be used to answer natural language questions about a set of documents for which one or more answers can be found and/or otherwise supported in a portion of the set of one or more documents. For example, the portion may be a chapter, a page, a paragraph, a sentence, a word, a phrase, and/or another portion of a document. In some cases, the retrieval tool may be used to answer keyword questions by applying a keyword search to the set of one or more documents and considering a limited scope around keyword matches.

In some implementations, the summarizer tool may provide summaries of content in a set of one or more documents. In some cases, the summarizer tool may be asked to provide a summary of an entire set of documents. In other cases, the summarizer tool may provide a summary for a chapter, a page, a paragraph, a sentence, and/or another portion of a document. In some implementations, the segment retrieval tool may be configured to identify one or more paragraphs, one or more pages, one or more chapters, and/or other sections of one or more documents 123. In some implementations, the segment retrieval tool may identify one or more sections including a particular keyword and/or other information. By way of non-limiting example, the segment retrieval tool may identify pages according to a set of parameters Some tools may be external to one or more large language models 133. For example, tools 136 may include, without limitation, a tool to convert electronic documents 123 from one particular format into another particular format (e.g., an optical character recognition tool or OCR tool), a tool to browse webpages (e.g., on the internet, such as a browser), a tool to provide definitions of words (e.g., a dictionary), a tool to translate from one language to another language, a tool to format content according to specified rules or restrictions, a tool to perform mathematical operations (e.g., a calculator, WOLFRAM ALPHA™, etc.), a tool to compose and send emails, a tool to create and/or modify spreadsheets, a contact tool to look up and/or retrieve email addresses based on a person's name or on other contact information, a tool to (help) deploy a set of (enterprise) software applications or (help) modify such a deployment, a tool to decompose a compound task into a combination of smaller tasks, and/or other tools.

In some implementations, user history information 132 may include previous user input received prior to receipt of the query from one or more client computing platforms 104, one or more outputs previously generated by one or more machine learning models 134, and/or other information. In some implementations, the previous user input may be a conversation history for particular user 127 associated with one or more client computing platforms 104 presenting one or more user interfaces 128. By way of non-limiting example, the conversation history may include user input received and/or outputs generated by one or more machine learning models 134 during an individual conversation via the particular user interface 128, a subset of conversations via the particular user interface 128 associated with the particular user, all of the conversations via the particular user interface 128 associated with the particular user, and/or during other periods of user interaction with one or more client computing platforms 104. By way of non-limiting example, user history information 132 may include one or more inputs provided to and/or one or more outputs generated by one or more machine learning models 134.

In some implementations, system prompt 130 may be the same, similar, or uniquely generated for the one or more prompts generated for the one or more queries. In some implementations, system prompt 130 may include instructions for how one or more machine learning models 134 are intended to function. By way of non-limiting example, system prompt 130 may be in a machine-readable format, natural language, and/or in another format. For example, system prompt 130 may include natural language indicating one or more machine learning models 134 are intended to use one or more tools 136, read as many pages of one or more documents 123 as necessary to complete one or more tasks, and/or other information.

In some implementations, the prompts may be prompts for one or more machine learning models 134. By way of non-limiting example, the prompt may be a prompt for one or more large language models 133 and/or one or more other machine learning models 134. In some implementations, an individual prompt may be generated for an individual query indicating any number of tasks. By way of non-limiting example, individual ones of the prompts may be in the form of natural language, a machine-readable format, and/or in another format.

Prompt component 110 may be configured to provide the prompts as input to one or more machine learning models 134. By way of non-limiting example, prompt component 110 may be configured to provide the prompt as input to one or more machine learning models 134. One or more machine learning models 134 may be configured to generate replies to the prompts. In some implementations, the replies may be generated by one or more machine learning models 134 responsive to receipt of the prompts as input. For example, one or more machine learning models 134 may be configured to generate one or more replies to the prompt. In some implementations, individual ones of the one or more replies may correspond to individual ones of the set of one or more tasks. By way of non-limiting example, the one or more replies may include a first reply corresponding to a first task.

Task identifying component 112 may be configured to identify the tasks indicated by the queries. By way of non-limiting example, task identifying component 112 may be configured to identify individual ones of the set of one or more tasks. The individual ones of the set of one or more tasks may be identified based on the prompt information. By way of non-limiting example, a first task may be identified. In some implementations, task identifying component 112 may be part of, include, and/or use one or more machine learning models 134. In some implementations, the prompt may be configured to prompt one or more machine learning models 134 to identify the individual ones of the set of one or more tasks. The first task may be identified by one or more machine learning models 134. For example, the first task may be identified using one or more large language models 133 and/or natural language analysis of the prompt and/or a first query. In the example of the first query including the acronym "CAGR" meaning "compound annual growth rate," one or more large language models 133 may determine the meaning of the acronym.

By way of non-limiting example, the individual ones of the set of one or more tasks may be identified by one or more large language models 133. In some implementations, the one or more tasks may be identified by determining semantic meaning of the query, identifying separate tasks specified within the query, and/or other steps. In some implementations, one or more tools 136 may be used by one or more machine learning models 134 for identifying the individual ones of the set of one or more tasks. Individual tasks in the set of tasks may fit together. For example, the output of a first task may be used as a parameter or input of a second task, the output of the second task may be used as an input of a third task, and so forth. In some implementations, such outputs may be included in user history information 132. In some implementations, at least one task in a particular set of tasks may have a context of a set of one or more documents 123, including but not limited to electronic source documents, including scanned images, captured photographs, and/or other documents in electronic format.

Step component 114 may be configured to determine one or more steps to be completed by one or more machine learning models 134. In some implementations, step component 114 may be part of, include, and/or use one or more machine learning models 134. In some implementations, the prompt may be configured to prompt one or more machine learning models 134 to determine the one or more steps to be completed by one or more machine learning models 134. The steps may be identified by one or more machine learning models 134. By way of non-limiting example, the one or more tools may be selected by one or more machine learning models 134. In some implementations, the one or more steps may be completed by one or more machine learning models 134 to provide broader and/or deeper context to one or more machine learning models 134 for completing particular tasks. The one or more steps determined may be determined based on information required by one or more machine learning models 134 to perform a particular task correctly and/or efficiently. In some implementations, the determination of the one or more steps may enable one or more machine learning models 134 to "reason" toward an output associated with the particular task and/or self-correct during determination of the output. In some implementations, the one or more steps may be any number of steps. In some implementations, the one or more steps may be determined prior to performing the steps, a step may be determined responsive to completion of another step, and/or a combination thereof.

By way of non-limiting example, step component 114 may be configured to determine a first step to be completed by one or more machine learning models 134. In some implementations, determining the first step may include selecting one or more tools included in set of one or more tools 136. In some implementations, the one or more tools may include a first tool. For example, the first tool may be included in set of one or more tools 136. The one or more tools selected may appear to be (most) suitable (or is deemed suitable) to perform the first step. By way of non-limiting example, one, two, three, or more steps may be determined for completion of a first task. In some implementations, step component 114 may be configured to determine whether or not any steps are necessary for one or more machine learning models 134 to generate an individual reply. For example, step component 114 may determine no steps are necessary for one or more machine learning models 134 to generate a first reply. In some implementations, determining no steps are necessary may include determining the prompt is sufficient for one or more machine learning models 134 to generate the first reply.

In the example of a first query including "What is the two year CAGR for Example Company's revenue," a sequence of steps may be determined for assisting one or more machine learning models 134 to generate the first reply. For example, the sequence of steps may include a document search for Example Company's revenue for the past two years, a page retrieval based on a result of the document search, a calculation of the CAGR based on results of the page retrieval, and/or other steps. For example, the document search may yield summaries and identifications of sections of a document determined by one or more large language models 133 and/or the retrieval tool to include information pertaining to the first task. For example, the page retrieval may yield individual pages from a document provided as context for the first task based on the sections identified by the document search. For example, the calculation of the CAGR may include a calculation involving one or more values included in the individual pages yielded by the page retrieval using the calculator tool. For example, the calculator tool may be used to validate a CAGR value explicitly denoted in one or more documents 123. For example, the calculator tool may be used because the two-year CAGR is not explicitly denoted in one or more documents 123.

Tool component 116 may be configured to perform one or more steps using one or more tools. In some implementations, tool component 116 may be part of, include, and/or use one or more machine learning models 134. In some implementations, a prompt may be configured to prompt one or more machine learning models 134 to generate the one or more tool results. The one or more tool results may be generated by one or more machine learning models 134. Determining the one or more steps, selecting the one or more tools, and/or performing the one or more steps may be completed by the same and/or different ones of one or more machine learning models 134. In some implementations, performing the one or more steps may include generating individual step prompts for individual ones of the one or more steps for one or more machine learning models 134. An individual step prompt for an individual step may include the prompt, the particular prompt information, an indication of the individual step, an identification of one or more tools to use for performing the individual step, and/or other information. In some implementations, performing the one or more steps may include providing the individual step prompts as input to one or more machine learning models 134. In some implementations, performing the one or more steps may include generating one or more tool results. By way of non-limiting example, the one or more tool results may be generated by one or more machine learning models 134 responsive to receipt of the step prompts as input. By way of non-limiting example, the first step may be performed using at least a first tool. For example, a first tool result may be generated responsive to the first step being performed.

Intermediary prompt component 118 may be configured to generate one or more intermediary prompts. In some implementations, intermediary prompt component 118 may be part of, include, and/or use one or more machine learning models 134. By way of non-limiting example, the prompt may be configured to prompt one or more machine learning models 134 to generate an intermediary prompt. The intermediary prompt may be defined by intermediary prompt information. Intermediary prompt component 118 may be configured to generate the intermediary prompt information. By way of non-limiting example, the intermediary prompt information may include the prompt information, a first tool result, and/or other information. By way of non-limiting example, the intermediary prompt and/or the prompt information may be in the form of natural language, a machine-readable format, and/or in another format. In some implementations, individual intermediary prompts may be generated responsive to generation of the one or more tool results. By way of non-limiting example, a first intermediary prompt may be generated responsive to generating the first tool result.

Intermediary prompt component 118 may be configured to determine whether the one or more intermediary prompts are sufficient to enable one or more machine learning models 134 to generate individual replies. In some implementations, the prompt may be configured to prompt one or more machine learning models 134 to determine whether the one or more intermediary prompts are sufficient to enable one or more machine learning models 134 to generate the individual replies. By way of non-limiting example, intermediary prompt component 118 may be configured to determine whether a first intermediary prompt is sufficient to enable one or more machine learning models 134 to generate a first reply. In some implementations, determining a particular intermediary prompt is sufficient to enable one or more machine learning models 134 to generate the individual replies may include determining whether the first tool result is sufficient.

By way of non-limiting example, intermediary prompt component 118 may determine a first tool result is not sufficient for one or more machine learning models 134 to generate a first reply. Responsive to determining the first tool result is not sufficient, step component 114 may be configured to determine a second step to be completed by one or more machine learning models 134. In some implementations, step component 114 may be configured to identify a second tool for performing the second step. For example, the identification of the second tool may be based on the tool information. Tool component 116 may be configured to perform the second step using the second tool. In some implementations, performing the second step may include generating a second tool result. The second tool result may be associated with a first task. Tool component 116 may be configured to obtain the second tool result. By way of non-limiting example, intermediary prompt component 118 may be configured to generate a second intermediary prompt responsive to generating the second tool result. For example, the second intermediary prompt may be defined by second intermediary prompt information. In some implementations, intermediary prompt component 118 may be configured to determine whether or not the second tool result is sufficient to enable the one or more machine learning models to generate a first reply. In some implementations, the determination of whether the second tool result is sufficient may be based on the second intermediary prompt information and/or other information.

Reply component 120 may be configured to identify a set of one or more tools for generating a subset of the one or more replies. Individual ones of the set of one or more tools may be included in one or more tools 136. The one or more tools selected may appear to be (most) suitable (or may be deemed suitable) to perform a first step. In some implementations, reply component 120 may be part of, include, and/or use one or more machine learning models 134. One or more machine learning models 134 may be configured to identify the set of one or more tools for generating the subset of the one or more replies. In some implementations, the set of one or more tools for generating the subset may be identified responsive to determining the one or more intermediary prompts are sufficient to enable one or more machine learning models 134 to generate individual replies of the subset. In some implementations, the set of one or more tools for generating the subset may be identified based on one or more of the prompt, the prompt information, the intermediary prompt, the intermediary prompt information, and/or other information. For example, an individual tool to generate a first reply may be identified. By way of non-limiting example, the individual tool may be identified responsive to determining an individual tool result is sufficient to enable one or more machine learning models 134 to generate the first reply.

Reply component 120 may be configured to generate one or more replies to the prompt. In some implementations, the one or more replies may be generated by one or more machine learning models 134. In some implementations, the one or more replies may be generated using individual ones of the set of one or more tools 136. In some implementations, the one or more replies may be generated based on one or more of the prompt, the prompt information, the intermediary prompt, the intermediary prompt information, sets of one or more tools for generating the one or more replies, and/or other information. By way of non-limiting example, generating the one or more replies may include generating a first reply. Reply component 120 may be configured to obtain the one or more replies to the individual ones of the set of one or more tasks. In some implementations, the one or more replies may be obtained from one or more machine learning models 134. By way of non-limiting example, the first reply may be obtained from one or more machine learning models 134.

In some implementations, reply component 120 may be configured to determine whether the individual replies are valid. By way of non-limiting example, reply component 120 may be configured to determine whether a first reply is valid based on an expected value, an expected format, and/or other expectations for the first reply. In some implementations, reply component 120 may be configured to generate a correction prompt, responsive to determining the first reply is not valid. Reply component 120 may be configured to update the first reply based on the correction prompt. In some implementations, updating the first reply may include providing the correction prompt as input to one or more machine learning models 134. Updating the first reply may include generating one or more updated replies to the correction prompt. In some implementations, the one or more updated replies may be generated by one or more machine learning models 134 using one or more tools. In some implementations, updating the first reply may include determining one or more steps to be completed prior to generating the one or more updated replies to the correction prompt.

In the example of the first query including the acronym "CAGR" meaning "compound annual growth rate," the first reply may be a negative value. In some implementations, one or more machine learning models 134 and/or one or more tool 136 may determine the first reply is likely to be incorrect. For example, the first reply may be determined to be likely to be incorrect by virtue of the first reply being a negative value despite Example Company's revenue increasing over the past two years. One or more machine learning models 134 may have determined such a relation between the two-year CAGR and changes to Example Company's revenue over time.

User interface component 122 may be configured to present one or more replies to individual ones of a set of one or more tasks. In some implementations, the one or more replies may be presented to one or more users 127 via one or more user interfaces 128. By way of non-limiting example, a first reply may be presented to a particular user interface via a particular user interface. In some implementations, presenting the one or more replies may include obtaining the one or more replies from one or more large language models 133. In some implementations, the one or more replies may be presented using natural language, graphics, images, charts, and/or other formats. In the example of the particular user interface being a chat interface, the first reply may be presented as a reply to the particular query in a chat format.

Figure 3:
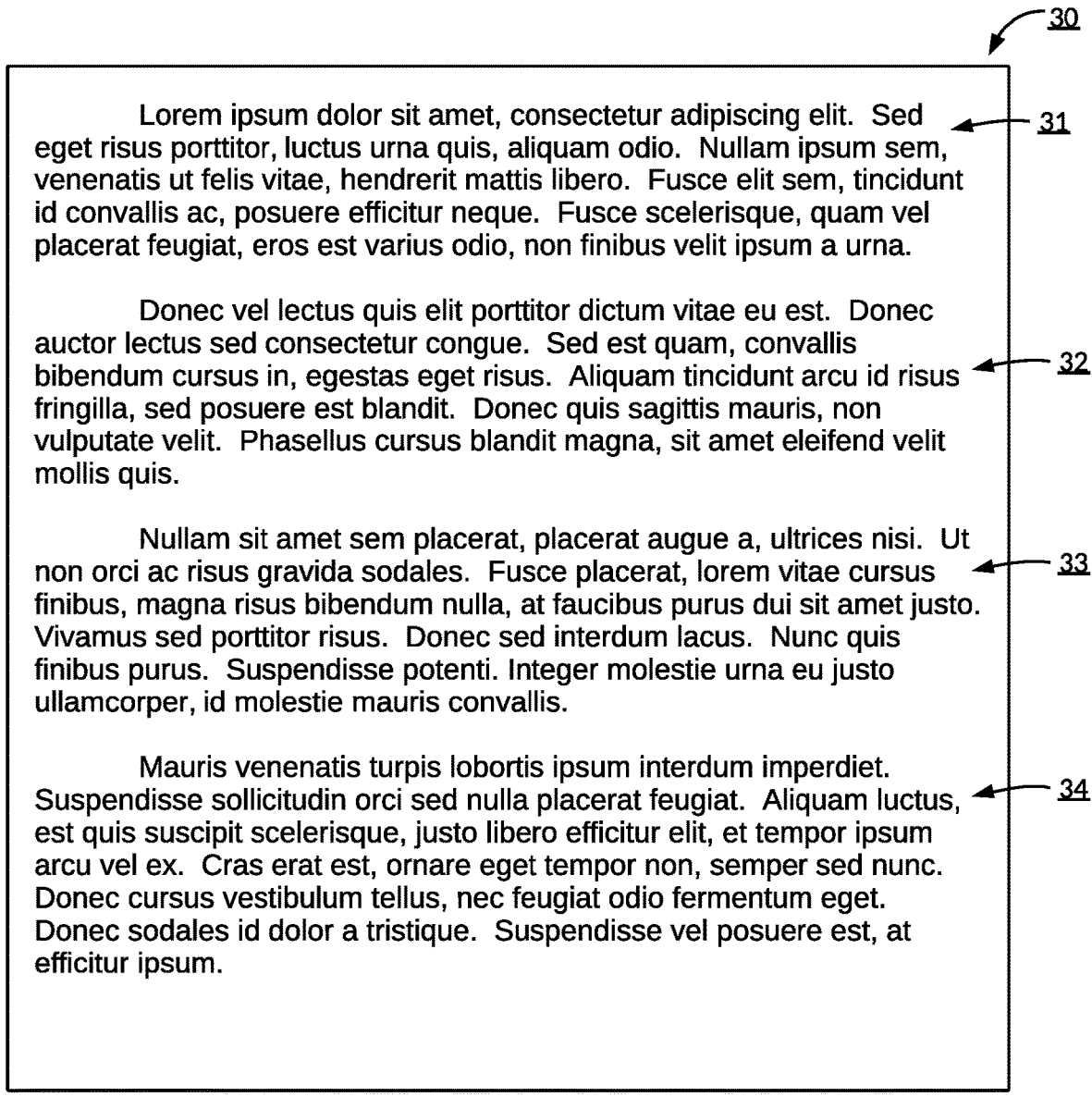
FIG. 3 illustrates an exemplary electronic document as may be used in a system configured to use one or more machine learning models to perform tasks as prompted using one or more tools.

By way of non-limiting example, FIG. 3 illustrates an exemplary page 30 of an exemplary document as may be used in system 100 (of FIG. 1), in accordance with one or more implementations. As depicted, exemplary page 30 includes a first paragraph 31, a second paragraph 32, a third paragraph 33, and a fourth paragraph 34. For example, first paragraph 31 includes five sentences. Exemplary page 30 may contain prose, narrative, and/or other natural language. In some cases, contents similar in type to exemplary document 30 may be suitable for natural language searching. For example, if a query (obtained from a user, through a user interface) is about "danger", or "deadly", or "poison", the word "venenatis" (from the Latin word for poisonous) in first paragraph 31 would be relevant for a reply. Likewise, document segments that include this word (such as, by way of non-limiting example, the third sentence of first paragraph 31) may be relevant for a reply. In some cases, adjacent paragraphs or document segments (such as, by way of non-limiting example, second paragraph 32) may be relevant.

As an example, using FIG. 3, a first query of a particular user, obtained through user interface 128, may be to "Compose an email to Alice of a summary of exemplary page 30." For example, this first query indicate a particular task. A first prompt may be generated based on the first query. For example, the first prompt may be "Using a set of available tools that include a retriever tool for natural language searches, a summarizer tool that can summarize the contents of a document or portion of a document, a calculator, and an email tool to compose emails, compose an email to Alice of a summary of exemplary page 30." One or more replies to the first prompt may be generated upon the particular task being performed. One or more steps may be determined for generation of a reply to the first prompt. By way of non-limiting example, the one or more steps may include a first step, a second step, and/or other steps. The first step may be to "Summarize exemplary page 30." By way of non-limiting example, the first step may be performed using the summarizer tool described in the first prompt. The second step may be to "Compose an email to Alice." By way of non-limiting example, the second step may be performed using the email tool described in the first prompt. In some implementations, the one or more steps may include a third step to "Retrieve an email address for Alice." The third step may be performed using the retriever tool described in the first prompt. A reply to the first prompt may include attaching the result of the first step to the result of the second step. The reply to the first prompt may include an email subject, email recipient, email body, a summary of exemplary page 30, and/or other information.

In some implementations, server(s) 102, client computing platform(s) 104, and/or external resources 142 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 142 may be operatively linked via some other communication media.

A given client computing platform 104 may include one or more processors configured to execute computer program components. The computer program components may be configured to enable an expert or user associated with the given client computing platform 104 to interface with system 100 and/or external resources 142, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 142 may include sources of information outside of system 100, external entities participating with system 100, and/or other resources. In some implementations, external resources 142 may include a provider of documents, including but not limited to electronic documents 123, from which system 100 and/or its components (e.g., source component 108) may obtain documents. In some implementations, external resources 142 may include a provider of information and/or models, including but not limited to extracted information 125, model(s) 134, and/or other information from which system 100 and/or its components may obtain information and/or input. In some implementations, external resources 142 may include and/or provide one or more tools 136. In some implementations, some or all of the functionality attributed herein to external resources 142 may be provided by resources included in system 100.

Server(s) 102 may include electronic storage 140, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 140 may comprise non-transitory storage media that electronically stores information. The electronic storage media of electronic storage 140 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 140 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 140 may include one or more virtual storage resources (e.g., cloud storage, a virtual private network, and/or other virtual storage resources). Electronic storage 140 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. Processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, 116, 118, 120, 122, and/or other components. Processor(s) 124 may be configured to execute components 108, 110, 112, 114, 116, 118, 120, 122, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 124 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 124 may be configured to execute one or more additional components that may perform some or all of the functionality attributed below to one of components 108, 110, 112, 114, 116, 118, 120, and/or 122.

Figure 2:
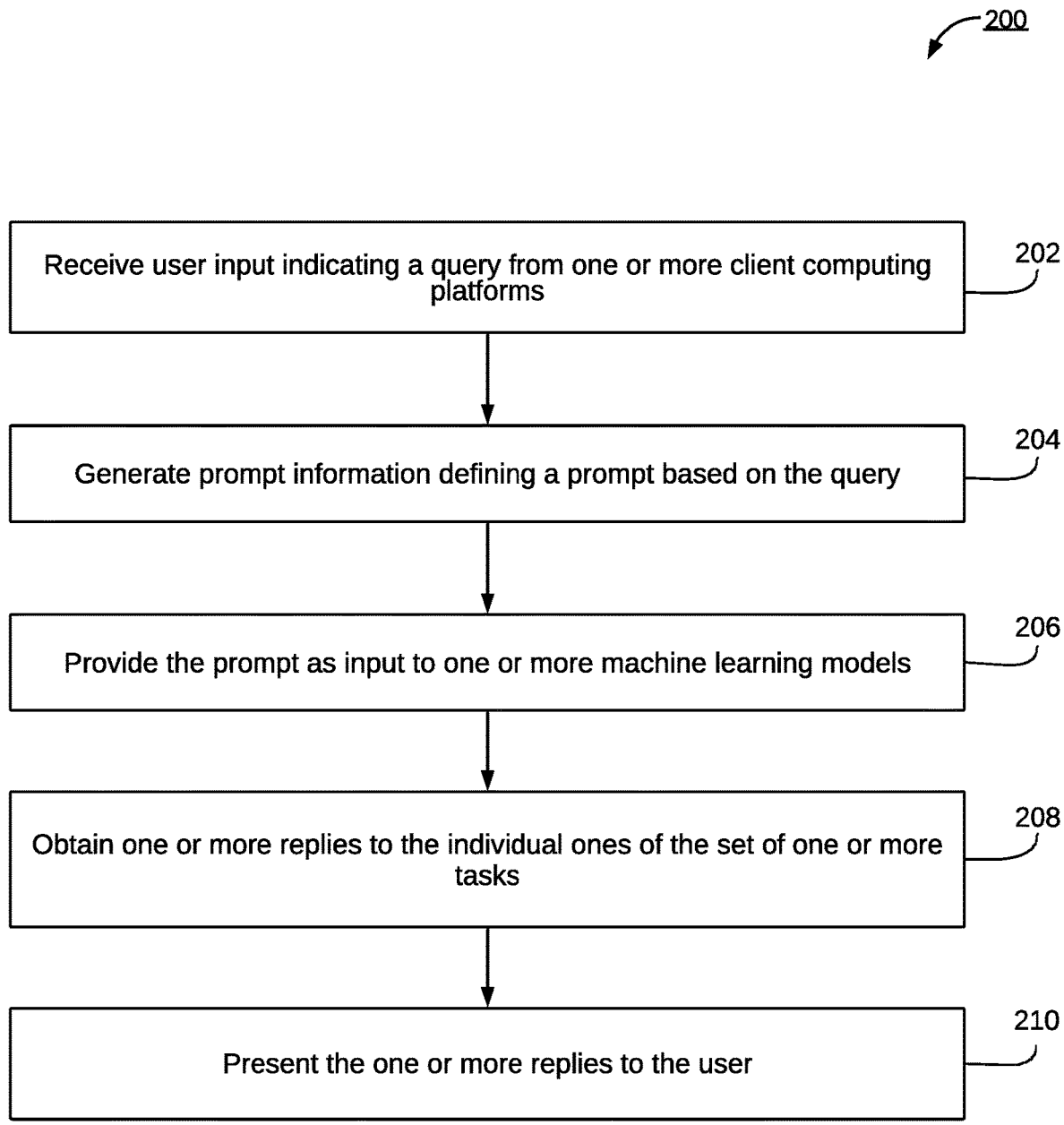
FIG. 2 illustrates a method for using one or more machine learning models to perform tasks as prompted using one or more tools.

FIG. 2 illustrates a method 200 of using one or more machine learning models to perform tasks as prompted using one or more tools, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving user input indicating a query from one or more client computing platforms. In some implementations, the query may indicate a set of one or more tasks. By way of non-limiting example, the set of one or more tasks may include at least a first task indicating a set of one or more documents. In some implementations, operation 202 may be performed by a query receiving component that is the same as or similar to query receiving component 108 (shown in FIG. 1 and described herein).

An operation 204 may include generating prompt information defining a prompt based on the query. In some implementations, the prompt information may include document information for individual ones of the set of one or more documents, tool information for individual ones of a set of one or more tools, the query, and/or other information. The document information for an individual document of the set of one or more documents may characterize the individual document. The tool information for an individual tool of the set of one or more tools may indicate the individual tool is available for use by the one or more machine learning models. In some implementations, operation 204 may be performed by a prompt component that is the same as or similar to prompt component 110 (shown in FIG. 1 and described herein).

An operation 206 may include providing the prompt as input to one or more machine learning models. In some implementations, the one or more machine learning models may be configured to generate one or more replies to the prompt responsive to receipt of the prompt as input. The one or more machine learning models may be the same as or similar to one or more machine learning models 134 (shown in FIG. 1 and described herein). Individual ones of the one or more replies may correspond to individual ones of the set of one or more tasks. The one or more replies may include a first reply corresponding to the first task. By way of non-limiting example, the first task may be identified. In some implementations, operation 206 may be performed by the prompt component that is the same as or similar to prompt component 110 (shown in FIG. 1 and described herein).

The prompt may be configured to prompt the one or more machine learning models to identify individual ones of the set of one or more tasks based on the prompt information. In some implementations, the individual ones of the set of one or more tasks may be identified by a task identifying component that is the same as or similar to task identifying component 112 (shown in FIG. 1 and described herein). The prompt may be configured to prompt the one or more machine learning models to determine a step to be completed by the one or more machine learning models. Determining the step may include selecting a first selected tool included in the set of one or more tools for performing the step based on the tool information. In some implementations, the step may be determined by a step component that is the same as or similar to step component 114 (shown in FIG. 1 and described herein). The prompt may be configured to prompt the one or more machine learning models to perform the step using the tool. By way of non-limiting example, performing the step may include generating a first tool result based on the step. In some implementations, the step may be performed by a tool component that is the same as or similar to tool component 116 (shown in FIG. 1 and described herein).

The prompt may be configured to prompt the one or more machine learning models to generate an intermediary prompt. The intermediary prompt may be defined by intermediary prompt information. The intermediary prompt information may include the prompt information and the first tool result. The prompt may be configured to prompt the one or more machine learning models to determine whether the intermediary prompt is sufficient to enable the one or more machine learning models to generate the first reply. In some implementations, the intermediary prompt may be generated by an intermediary prompt component that is the same as or similar to intermediary prompt component 118 (shown in FIG. 1 and described herein). The prompt may be configured to prompt the one or more machine learning models to identify a set of one or more tools for generating a subset of the one or more replies. In some implementations, the set of one or more tools may be identified by a reply component that is the same as or similar to reply component 120 (shown in FIG. 1 and described herein). The prompt may be configured to prompt the one or more machine learning models to generate the one or more replies responsive to determining the intermediary prompt is sufficient. The one or more replies may be generated using individual ones of the set of one or more tools. Generating the one or more replies may include generating the first reply based on the intermediary prompt information. In some implementations, the one or more replies may be generated by the reply component. The prompt may be configured to prompt the one or more machine learning models to perform one or more other activities.

An operation 208 may include obtaining the one or more replies to the individual ones of the set of one or more tasks. In some implementations, the one or more replies may be obtained from the one or more machine learning models. By way of non-limiting example, the first reply may be obtained. In some implementations, operation 208 may be performed by a reply component that is the same as or similar to reply component 120 (shown in FIG. 1 and described herein).

An operation 210 may include presenting the one or more replies to the user. In some implementations, the one or more replies may be present through a user interface on one or more client computing platforms. The user interface on the one or more client computing platforms may be the same as or similar to one or more client computing platforms 127 on one or more client computing platforms 128 (shown in FIG. 1 and described herein). By way of non-limiting example, the first reply may be presented. In some implementations, operation 210 may be performed by a user interface component that is the same as or similar to user interface component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to use one or more machine learning models to perform tasks as prompted using one or more tools, the system comprising:

one or more hardware processors configured by machine readable instructions to:

receive user input indicating a query from one or more client computing platforms, wherein the query indicates a set of one or more tasks, wherein the set of one or more tasks includes at least a first task indicating a set of one or more documents;

generate prompt information defining a prompt based on the query, wherein the prompt information includes document information for individual ones of the set of one or more documents, tool information for individual ones of a set of one or more tools, and the query, wherein the document information for an individual document of the set of one or more documents characterizes the individual document, and wherein the tool information for an individual tool of the set of one or more tools indicates the individual tool is available for use by the one or more machine learning models;

provide the prompt as input to one or more machine learning models, wherein the one or more machine learning models are configured to generate one or more replies to the prompt responsive to receipt of the prompt as input, wherein individual ones of the one or more replies correspond to individual ones of the set of one or more tasks, wherein the one or more replies include a first reply corresponding to the first task, the prompt being configured to prompt the one or more machine learning models to:
(i) identify individual ones of the set of one or more tasks based on the prompt information such that the first task is identified,
(ii) determine a step to be completed by the one or more machine learning models, wherein determining the step includes selecting a first selected tool included in the set of one or more tools for performing the step based on the tool information,
(iii) perform the step using the tool, wherein performing the step includes generating a first tool result based on the step,
(iv) generate an intermediary prompt, wherein the intermediary prompt is defined by intermediary prompt information, wherein the intermediary prompt information includes the prompt information and the first tool result,
(v) determine whether the intermediary prompt is sufficient to enable the one or more machine learning models to generate the first reply,
(vi) identify a set of one or more tools for generating a subset of the one or more replies responsive to determining the intermediary prompt is sufficient, and
(vii) generate, using individual ones of the set of one or more tools, the one or more replies, wherein generating the one or more replies includes generating the first reply based on the intermediary prompt information;
obtain, from the one or more machine learning models, the one or more replies to the individual ones of the set of one or more tasks such that the first reply is obtained; and
present to a user, through a user interface on the one or more client computing platforms, the one or more replies to the individual ones of the set of one or more tasks such that the first reply is presented.

2. The system of claim 1, the prompt being configured to further prompt the one or more machine learning models to:
determine whether the first reply is valid based on an expected value and/or an expected format of the first reply;
generate a correction prompt responsive to determining the first reply is not valid, and
update the first reply based on the correction prompt.

3. The system of claim 1, wherein the individual tool is a relation between an input received by the one or more machine learning models and an output generated by the one or more machine learning models responsive to receipt of the input, wherein the tool information for the individual tool includes a description of types of tasks the individual tool can complete.

4. The system of claim 1, wherein the one or more hardware processors are further configured to:
receive a second query from the one or more client computing platforms; and
generate second prompt information characterizing a second prompt for one or more machine learning models based on the second query, wherein the second prompt information includes second document information for individual ones of a second set of one or more documents, second tool information for individual ones of a second set of one or more tools, the second query, and historical information, wherein the historical information characterizes one or more of the first prompt, the step, and/or the first reply.

5. The system of claim 1, wherein the set of one or more tools includes one or more of a calculator, a keyword search tool, a text processor tool, and a segment retrieval tool, wherein the text processor tool extracts semantic meaning from text included in one or more documents, wherein the segment retrieval tool extracts text included in one or more documents.

6. The system of claim 1, wherein performing the step includes determining the prompt is sufficient for the one or more machine learning models to generate the first reply.

7. The system of claim 1, the prompt being configured to further prompt the one or more machine learning models to:
determine, responsive to determining the first tool result is not sufficient, a second step to be completed by the one or more machine learning models prior to generating the first reply, wherein determining the second step includes identifying a second tool for performing the second step based on the tool information,
perform the second step using the second tool, wherein performing the second step includes generating a second tool result, wherein the second tool result is associated with the first task,
obtain the second tool result, and
determine the second tool result is sufficient to enable the one or more machine learning models to generate the first reply.

8. The system of claim 1, wherein the one or more hardware processors are further configured by machine readable instructions to:
effectuate a presentation of a particular user interface via the one or more client computing platforms, the particular user interface including one or more fields configured to receive the user input indicating the query.

9. A method for using one or more machine learning models to perform tasks as prompted using one or more tools, the method comprising:
receiving user input indicating a query from one or more client computing platforms, wherein the query indicates a set of one or more tasks, wherein the set of one or more tasks includes at least a first task indicating a set of one or more documents;
generating prompt information defining a prompt based on the query, wherein the prompt information includes document information for individual ones of the set of one or more documents, tool information for individual ones of a set of one or more tools, and the query, the document information for an individual document of the set of one or more documents characterizing the individual document, the tool information for an individual tool of the set of one or more tools indicating the individual tool is available for use by the one or more machine learning models;
providing the prompt as input to one or more machine learning models, wherein the one or more machine learning models are configured to generate one or more replies to the prompt responsive to receipt of the prompt as input, wherein individual ones of the one or more replies correspond to individual ones of the set of one or more tasks, wherein the one or more replies include a first reply corresponding to the first task, the prompt being configured to prompt the one or more machine learning models to:
  identify individual ones of the set of one or more tasks based on the prompt information such that the first task is identified,
  determine a step to be completed by the one or more machine learning models, wherein determining the step includes selecting a first selected tool included in the set of one or more tools for performing the step based on the tool information,
  perform the step using the tool, wherein performing the step includes generating a first tool result based on the step,
  generate an intermediary prompt, wherein the intermediary prompt is defined by intermediary prompt information, wherein the intermediary prompt information includes the prompt information and the first tool result,
  determine whether the intermediary prompt is sufficient to enable the one or more machine learning models to generate the first reply,
  identify a set of one or more tools for generating a subset of the one or more replies, and
  generate, using individual ones of the set of one or more tools, the one or more replies responsive to determining the intermediary prompt is sufficient, wherein generating the one or more replies includes generating the first reply based on the intermediary prompt information;
 obtaining, from the one or more machine learning models, the one or more replies to the individual ones of the set of one or more tasks such that the first reply is obtained; and
 presenting to a user, through a user interface on the one or more client computing platforms, the one or more replies to the individual ones of the set of one or more tasks such that the first reply is presented.

10. The method of claim 9, the prompt being configured to further prompt the one or more machine learning models to:
  determine whether the first reply is valid based on an expected value and/or an expected format of the first reply;
  generate a correction prompt responsive to determining the first reply is not valid, and
  update the first reply based on the correction prompt.

11. The method of claim 9, wherein the individual tool is a relation between an input received by the one or more machine learning models and an output generated by the one or more machine learning models responsive to receipt of the input, wherein the tool information for the individual tool includes a description of types of tasks the individual tool can complete.

12. The method of claim 9, wherein the method further comprises:
  receiving a second query from the one or more client computing platforms; and
  generating second prompt information characterizing a second prompt for one or more machine learning models based on the second query, wherein the second prompt information includes second document information for individual ones of a second set of one or more documents, second tool information for individual ones of a second set of one or more tools, the second query, and historical information, wherein the historical information characterizes one or more of the first prompt, the step, and/or the first reply.

13. The method of claim 9, wherein the set of one or more tools includes one or more of a calculator, a keyword search tool, a text processor tool, and a segment retrieval tool, wherein the text processor tool extracts semantic meaning from text included in one or more documents, wherein the segment retrieval tool extracts text included in one or more documents.

14. The method of claim 9, wherein performing the step includes determining the prompt is sufficient for the one or more machine learning models to generate the first reply.

15. The method of claim 9, the prompt being configured to further prompt the one or more machine learning models to:
  determine, responsive to determining the first tool result is not sufficient, a second step to be completed by the one or more machine learning models prior to generating the first reply, wherein determining the second step includes identifying a second tool for performing the second step based on the tool information,
  perform the second step using the tool, wherein performing the second step includes generating a second tool result, wherein the second tool result is associated with the first task,
  obtain the second tool result, and
  determine the second tool result is sufficient to enable the one or more machine learning models to generate the first reply.

16. The method of claim 9, wherein the method further comprises:
  effectuating a presentation of a particular user interface via the one or more client computing platforms, the particular user interface including one or more fields configured to receive the user input indicating the query.

* * * * *